United States Patent [19]
Shelton, Jr.

[11] Patent Number: 6,013,963
[45] Date of Patent: Jan. 11, 2000

[54] HIGH EFFICIENCY ELECTRO-MECHANICAL ENERGY CONVERSION DEVICE

[75] Inventor: Roy C. Shelton, Jr., Rowlett, Tex.

[73] Assignee: EMEC Energy, L.L.C., Plano, Tex.

[21] Appl. No.: 09/244,728

[22] Filed: Feb. 5, 1999

[51] Int. Cl.[7] .............................. H02K 1/00; H02K 21/12; H02K 1/12
[52] U.S. Cl. .......................... 310/179; 310/156; 310/194; 310/216; 310/259
[58] Field of Search .................................. 310/179, 180, 310/184, 194, 198, 208, 156, 216, 261, 265, 233, 232, 236, 254, 258, 259, 40, 66, 67 R; 322/16, 17, 46, 51, 52; 318/138, 254, 139, 722, 724, 731–734, 738, 244, 245, 491, 494, 498, 499, 500

[56] References Cited

U.S. PATENT DOCUMENTS

| | | | |
|---|---|---|---|
| 1,835,721 | 12/1931 | Powell | 310/46 |
| 1,859,643 | 5/1932 | Worthington | 310/46 |
| 1,963,213 | 6/1934 | Poysa | 172/36 |
| 2,279,690 | 4/1942 | Lindsey | 171/252 |
| 3,374,376 | 3/1968 | Kromrey | 310/112 |
| 3,869,627 | 3/1975 | Ingenito et al. | 310/162 |
| 4,305,024 | 12/1981 | Kuroki | 318/254 |
| 4,443,776 | 4/1984 | Cunningham | 335/302 |
| 4,709,180 | 11/1987 | Denk | 310/179 |
| 4,852,245 | 8/1989 | Denk | 29/596 |
| 4,904,926 | 2/1990 | Pasichinskyj | 323/362 |
| 4,968,911 | 11/1990 | Denk | 310/42 |
| 5,006,744 | 4/1991 | Archer et al. | 310/89 |
| 5,191,258 | 3/1993 | German | 310/254 |
| 5,436,518 | 7/1995 | Kawai | 310/156 |

*Primary Examiner*—Nestor Ramirez
*Assistant Examiner*—Dane Dinh Le
*Attorney, Agent, or Firm*—Smith & Danamraj, P.C.

[57] ABSTRACT

An Electro-Mechanical Energy Conversion (EMEC) device and a method of electro-magnetically converting electrical energy to mechanical energy and electrical energy. The EMEC device comprises a stator; a rotor; a direct current power source; a commutator, and flourescent lamps acting as a non-linear, capacitive, voltage-limiting load. Four armature coils of a first magnetic polarity are concentrically mounted on a first side of the outer surface of a non-magnetic cylindrical stator casing, and four armature coils of an opposite polarity are concentrically mounted on an opposite side of the stator casing. Each coil is wound with an average of 6,650 turns of 34 AWG gauge teflon-coated wire. The rotor is constructed of non-magnetic material, and is rotationally mounted in the stator casing. A plurality of neodymium iron-boron permanent magnets are circumferentially mounted on the rotor. The magnets on a first side of the rotor are mounted with a first outward polarity, and the magnets on an opposite side of the rotor are mounted with an opposite outward polarity. The power source is connected to the coils and produces an output of 0–5,000 volts at 30 to 40 milliamperes maximum. The flourescent lamps are connected to the coils for rapidly dumping magnetic energy from the coils when the polarity is reversed. The commutator reverses the polarity of the first and second coils every 180° of rotor rotation, and guides the magnetic energy from the coils to the load.

19 Claims, 8 Drawing Sheets

HIGH EFFICIENCY ELECTRO-MECHANICAL ENERGY CONVERSION DEVICE

BACKGROUND OF THE INVENTION

1. Technical Field of the Invention

This invention relates to electric motor-generators and, more particularly, to a high efficiency electro-mechanical energy conversion device which utilizes an unconventional configuration and unconventional operating parameters to achieve high efficiency operation.

2. Description of Related Art

Electric motors are known in which permanent magnets are mounted on a rotating shaft while electromagnetic armature coils on a stator are used to produce an armature magnetic field. Since the poles of the armature magnetic field are electromagnetically produced by an externally applied voltage source, the torque and speed resulting from the rotor response is a motor action. As the rotor turns, the magnetic flux lines of the permanent magnet rotor cut the turns of the armature windings wrapped on the stator. By Faraday's law, a voltage is induced in the armature turns, the magnitude of which equals the time rate of change of flux linkages (the derivative with respect to time of the product of the number of coil turns and the magnetic flux). In classical electric motors, this is a counter electromotive force (emf) or counter voltage which regulates the current flowing from the externally applied voltage or power source into the motor armature so that the actual torque produced by the armature equals only that amount needed to counteract the load torque and produce the desired speed of armature rotation.

The armature winding typically consists of a few turns of relatively thick wire in order to support the flow of large armature currents to develop the desired torque. Large armature currents are utilized because classical equations suggest that the rotor torque is directly proportional to the armature current. However, the requirement for large armature currents reduces the efficiency of the motor, with the efficiency being defined as the ratio of the rotational mechanical energy coming out of the motor to the electrical energy going in.

In order to overcome the disadvantages of existing electric motor-generators, it would be advantageous to have an Electro-Mechanical Energy Conversion (EMEC) device that greatly reduces the input current level required to achieve a desired output torque and the resultant output level of mechanical energy. The present invention provides such a device.

SUMMARY OF THE INVENTION

The present invention is an Electro-Mechanical Energy Conversion (EMEC) device comprising a stator, a rotor rotationally mounted in the stator, a direct current power source, and a switching device. The stator includes a first coil of a first magnetic polarity mounted on a first side of the stator and a second coil of an opposite polarity mounted on an opposite side of the stator. The rotor includes at least two permanent magnets mounted circumferentially thereon, a first magnet on a first side of the rotor having a first outward polarity, and a second magnet on an opposite side of the rotor having an outward polarity opposite the first polarity. The direct current power source is connected to the coils, and has an output of at least 450 volts in a range of 30 to 40 milliamperes. The switching device operates to reverse the polarity of the first and second coils every 180° of rotor rotation. The EMEC device may also include a non-linear, capacitive, voltage-limiting load connected to the coils for rapidly dumping magnetic energy from the coils when the switching device reverses the polarity of the first and second coils.

In another aspect, the present invention is an EMEC device comprising a stator; a rotor; a direct current power source; a non-linear, capacitive, voltage-limiting load; and a commutator. The stator includes a cylindrical stator casing, a first armature coil of a first magnetic polarity, and a second armature coil of a polarity opposite the first polarity. The cylindrical stator casing is constructed of non-magnetic material, and has an inner surface and an outer surface. The first armature coil comprises four similar rectangular coils concentrically mounted on a first side of the outer surface of the stator casing, each rectangular coil comprising at least 6,000 turns of 34 AWG gauge teflon-coated wire. The second armature coil comprises four similar rectangular coils concentrically mounted on a side of the outer surface of the stator casing opposite the first side, each rectangular coil comprising at least 6,000 turns of 34 AWG gauge teflon-coated wire. The rotor is constructed of non-magnetic material, and is rotationally mounted in the stator casing. The rotor includes a plurality of permanent magnets mounted circumferentially thereon. The magnets on a first side of the rotor have a first outward polarity, and the magnets on an opposite side of the rotor have an outward polarity opposite the first outward polarity. The outer surface of the permanent magnets is approximately 0.2 inches from the inner surface of the stator casing. The direct current power source is connected to the coils and includes a regulated, voltage-controlled voltage multiplier with an output of 0–5,000 volts at 30 to 40 milliamperes maximum, and a wet cell connected in parallel with the voltage multiplier. The non-linear, capacitive, voltage-limiting load is connected to the coils for rapidly dumping magnetic energy from the coils. The commutator includes means for reversing the polarity of the first and second coils every 180° of rotor rotation, and means for guiding the magnetic energy from the coils to the non-linear, capacitive, voltage-limiting load prior to reversal of the polarity.

In yet another aspect, the present invention is a method of electro-magnetically converting electrical energy to mechanical energy and electrical energy. The method includes the steps of winding each coil of a plurality of armature coils with at least 6,000 turns of 34 AWG gauge wire, and mounting the plurality of armature coils on an outer surface of a non-magnetic cylindrical stator casing. At least one coil of a first magnetic polarity is mounted on a first side of the stator casing, and at least one coil of an opposite polarity is mounted on an opposite side of the stator casing. The method also includes circumferentially mounting a plurality of permanent magnets on a non-magnetic rotor. The magnets on a first side of the rotor are mounted with a first outward polarity, and the magnets on an opposite side of the rotor are mounted with an outward polarity opposite the first outward polarity. This is followed by rotationally mounting the rotor along the longitudinal axis of the cylindrical stator casing, the rotor being sized so that there is a clearance of approximately 0.2 inches between the outer surface of each magnet and an inner surface of the stator casing. The method also includes connecting a direct current power source to the coils, the output of the power source being variable from 0 to 5,000 volts at a maximum current of approximately 40 milliamperes, and connecting a non-linear, capacitive, voltage-limiting load to the coils for rapidly dumping magnetic energy from the coils. Finally, a commutator is connected to the power source, the coils, and the load. The commutator operates to reverse the polarities of the armature coils in a manner so as to rotate the rotor and produce a counter-electrical voltage. The method may also include the step of applying the counter-electrical voltage to charge the power source.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
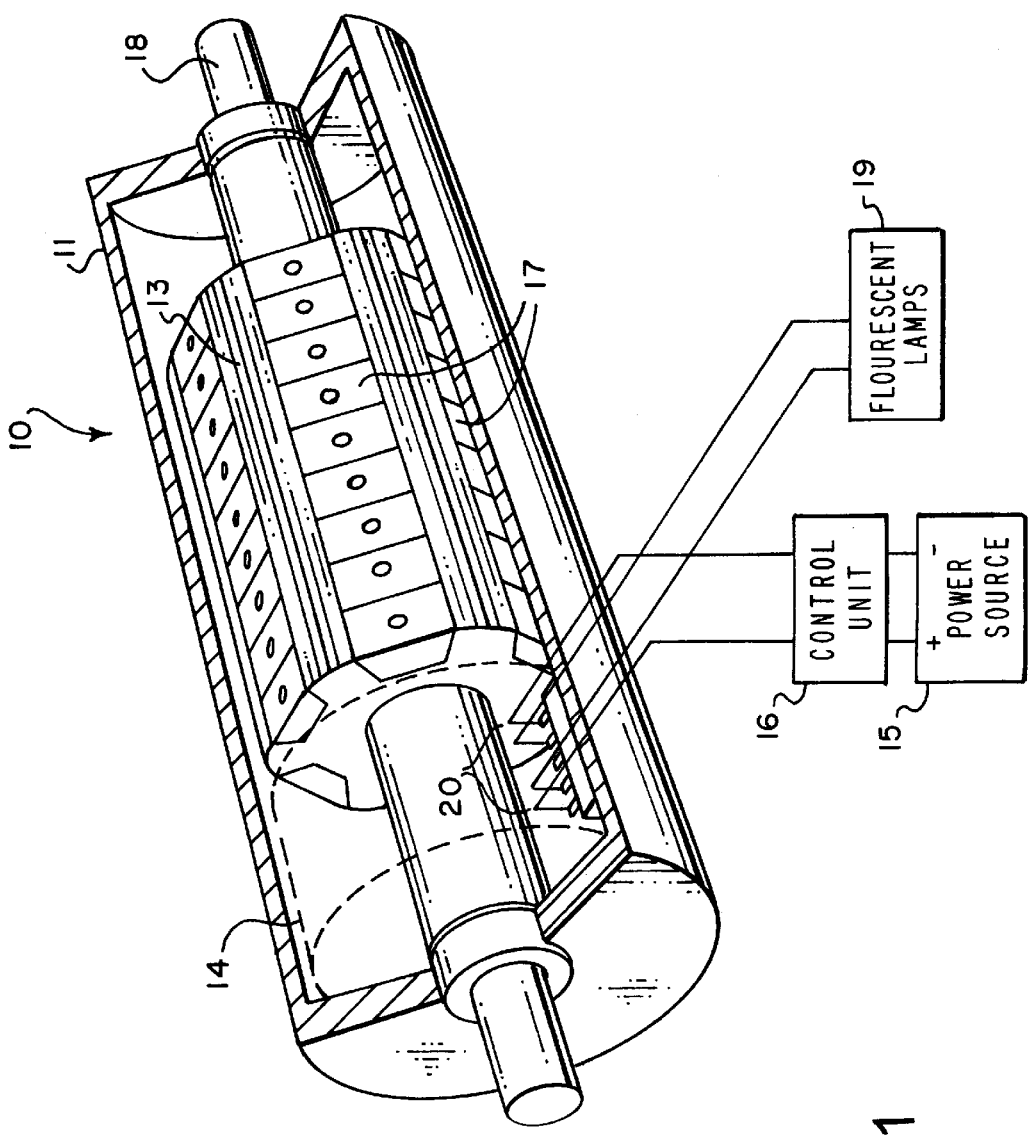
FIG. 1 is a cut-away perspective view of the Electro-Mechanical Energy Conversion (EMEC) device of the preferred embodiment of the present invention.

The vital link between the electrical and mechanical energy systems of an electric motor-generator is the magnetic field. The magnetic field can be produced by a system of permanent magnets, by a system of electrically energized coils, or by a combination of the above. According to Faraday's law, the voltage induced in a coil of wire by a changing magnetic flux is determined by the equation:

$$e = -dN\Phi/dt = -d\lambda/dt$$

where N is the number of coil turns, $\Phi$ is the magnetic flux (webers), and $\lambda = N\Phi$ is the coil flux linkage. Thus, the voltage induced in the coil equals the number of coil turns times the time rate of change of the flux linking the coils, and its polarity is opposite of the flux gradient. Stated another way, the voltage induced in a coil of wire equals the time rate of change of flux linkages, and its polarity is opposite of the flux gradient. This induced voltage regulates the power drawn from (or supplied to) the electrical energy source connected to the motor-generator.

The magnetic field (represented by ($\Phi$ or $\lambda$) induces this dynamic voltage and also develops the mechanical output torque. In the present invention, the non-constant, non-sinusoidal, near-exponential time rate of change of flux linkages develops a counter electromotive force (emf) or counter voltage which spikes at the point of commutation. This counter voltage, when integrated over time, produces a net positive generated voltage (and current to a resistive load). As a consequence, a generator action is developed while the present invention is operating as a motor (i.e., producing a net positive output torque).

The torque developed in the present invention results from the attraction and repulsion between magnetic poles on the rotor and stator. Since like poles produce a mechanical force of repulsion, and unlike poles produce a mechanical force of attraction, a rotor north pole situated between the stator north and south poles will experience a net mechanical force away from the stator north pole and an additive mechanical force of attraction towards the stator south pole. In order that a continuous torque in the same direction be produced, the rotor must have the same number of poles as the stator, and there must be an even number of poles (i.e., every north pole must be associated with a complementary south pole).

In a D.C. motor-generator, maximum torque is produced in the rotor when the rotor poles are 90 degrees displaced (magnetically) from the stator poles. When the rotor north pole is aligned with the stator south pole, the magnetic angular displacement is zero (0) degrees. A displacement of 180 degrees occurs when the rotor north pole and stator north pole are aligned. In the EMEC device of the present invention, the armature winding is on the stator. The magnetic field, produced by high strength permanent magnets mounted on the rotor, produces a magnetic flux that cuts the coil windings of the armature as the rotor turns. Electrical energy is supplied to, and derived from, the armature windings by a system of commutation bars and slip rings that compel the stator poles to remain configured such that a net positive torque is produced throughout the entire 360 degree movement of the rotor. Since the rotor, operating in the steady-state, is designed to unidirectionally rotate, then a unidirectional rotating magnetic field is thereby established in the armature winding.

As noted above, in the classical motor, the armature winding typically consists of a few turns of relatively thick wire in order to support the flow of large armature currents to deliver the desired torque. Large armature currents are utilized because classical equations suggest that the rotor torque is directly proportional to the armature current. For example, the equation for power, the time rate of doing work, is classically recognized as:

$$P = T\omega = E_g I_a = K\Omega I_a \Phi$$

where T is rotor torque, $\omega$ is rotor speed, $E_g$ is the average value of the induced voltage as viewed from the commutator brushes, $I_a$ is the armature D.C. current external to the motor, K is an armature constant, $\Omega$ is armature speed (i.e., the armature commutation rate), and $\Phi$ is magnetic field flux. Thus, power may be defined as (1) rotor torque times rotor speed, (2) generated armature voltage times armature current, or (3) the armature constant times the product of armature speed, armature current, and field flux. $E_g$ cannot be actually measured because it assumes that the distributed resistance of the armature is not present. However, $E_g$ can be approximated as the no-load value of the brush voltage when the machine is operated purely as a generator. In addition, it is clearly recognized that the armature current in all D.C. machines is an A.C. value. This is required in order to maintain uniformity between stator and rotor poles so that torque is optimized for every value of armature current. Rearranging the above equation to express torque yields:

$$T = K' I_a$$

where K' is a constant comprising the armature constant, the ratio of the armature commutation rate to rotor speed, and a constant field flux. This equation states that for a constant field flux, as produced by the permanent magnets implanted on the rotor, rotor torque is directly proportional to armature current, when rotor speed is a parameter. Thus, conventional electric motor design has focused on designs which enable the use of large armature currents.

The present invention is a high efficiency Electro-Magnetic Energy Conversion EMEC) device which utilizes an unconventional configuration and unconventional operating parameters to achieve high efficiency operation. In the EMEC device of the present invention, the armature winding consists of a very large number of turns of very thin wire. This high number of armature turns, and the thin wire, produce a very high coil resistance. Also, several of these coils are connected in series at any one time between the armature brushes of the EMEC device. The application of several thousand volts to the armature brushes produces an armature current of only a few milliamperes (mA).

At any given rotor speed, the shift of the angle of the induced armature voltage is the angle which has a tangent equal to the product of the rotor speed and armature coil inductance divided by armature resistance. That is, tan $\alpha=\omega L/R$, where a is the relative angle shift (actual angle shift is 90°-$\alpha$) in radians, $\omega$ is the rotor speed, L is the armature coil inductance in henrys, and R is armature coil resistance in ohms. The time-delayed induced voltage of this shift, modulated by the net effect of the products of commutation, produces an armature coil voltage-current resultant that delivers electrical power to the externally applied source. Therefore, generator action is produced while the EMEC device is operating as a motor.

In large part, much of the description of the operation of the invention can be understood by thinking of the invention as an electrical transformer that has a component that rotates. What makes the present invention different from any other electric motor, however, is its efficiency of operation. Its operation is very much like any other motor with the exception that at least one principle of its operation is diametrically opposed to conventional electric motor design theory and standards.

In the development of magneto motive force (MW), it is conventionally taught that it is desirable to have a high current operating on some coil turns. Higher currents then produce higher MMF and more rotational mechanical energy out of the motor. In the present invention, however, the magnitude of current is kept extremely small, and the number of coil turns is maximized in order to produce, in essence, the same MMF. In addition, the configuration of the coils produces uniform, dense magnetic flux throughout the region of rotor rotation, thereby producing a larger area for the MMF to operate against in producing torque.

Many of the operational characteristics stated for the EMEC device of the present invention assume linearity of the magnetic medium. In order to assure linearity, non-ferrous materials are used in nearly every area of the machine's construction including the main shaft, the casing, and commutator bars. This also allows the coil magnetic field to not only extend through the region of rotor rotation, but also to extend externally from the device into surrounding space.

FIG. 1 is a cut-away perspective view of the EMEC device 10 of the preferred embodiment of the present invention. Unique designs of each of the components, and an unconventional overall configuration, contribute to the high efficiency achieved by the present invention. The EMEC device comprises a stator casing 11 which has a plurality of coils 12 mounted thereon (see FIG. 2), a rotor 13, a commutator 14 (shown in phantom), an external power source 15, and a control unit 16. The rotor includes a plurality of permanent magnets 17 mounted around a rotor shaft 18. A bank of flourescent lamps 19 may also be included for rapid dumping of the magnetic energy of the coils during commutation. A plurality of stationary contactors 20 are utilized to make and break connections on the commutator 14, thereby controlling the application of power from the power source 15, and controlling the dumping of the coil magnetic energy to the flourescent lamps 19.

The Stator

Figure 2:
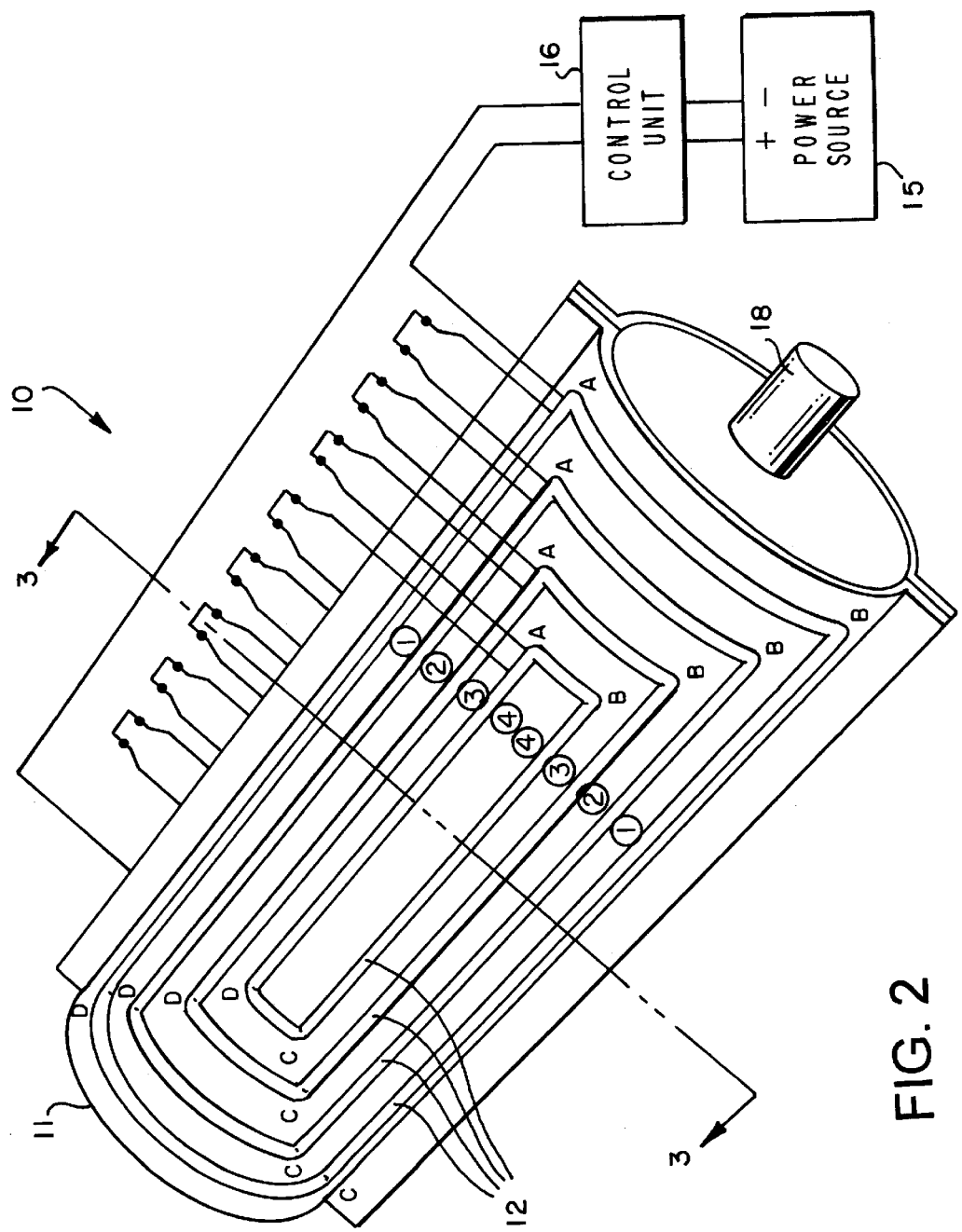
FIG. 2 is a top perspective view of the stator illustrating the coil configuration.

FIG. 2 is a top perspective view of the stator casing 11 illustrating the configuration of the coils 12. The stator (collectively, the stator casing and coils) establishes a reference, and the rotor 13 functions relative to the stator. The stator is the stationary mechanism that produces a magnetic field environment that induces rotation on the part of the rotor. The stator casing is constructed of a non-ferrous (non-magnetic) material such as 6061 aluminum which enables the magnetic flux density to pass freely into and out of the device. Although a solid casing is illustrated, an open frame may also be utilized as long as the armature coils are not shielded and the magnetic flux density produced by the coils is allowed to pass freely into and out of the device.

The embodiment described herein is a bipolar EMEC device, therefore an identical coil configuration is implemented on both the top and the bottom halves of the stator casing. In the preferred embodiment, eight coils are mounted on the outside of the stator casing, four on the top and four on the bottom, although a greater or lesser number of coils may be utilized. The primary consideration in the configuration and number of coils is the production of axially uniform, dense magnetic flux along the outer surface (the rotor-stator interface surface) of the rotor magnets, thereby producing a larger area for the MMF to operate against in producing torque. The coils, having at least 6,000 turns each of extremely thin (approximately 34 AWG gauge) wire, are wound as rectangles following the path A-B-C-D-A in each coil, and are then mounted on the stator casing. In the preferred embodiment, there is an average of 6,650 turns in each coil, utilizing 33,500 feet of 34 AWG gauge, teflon-coated copper wire per coil. In total, there are 53,200 turns and approximately 266,000 feet of wire in the eight coils. The coils are then connected in series to the external power source 15. The coils may also be connected in parallel, or in a parallel/series combination, if it is desired to increase the magnetic flux density within the stator casing in order to control the output of the EMEC device.

The extreme length of the wire creates a high resistance. The high resistance, however, does not create an operational constraint on the device since the input current in the present invention is measured in milliamperes rather than hundreds of amperes as is utilized in many prior art electric motors. The smaller current operates on a much larger number of turns in the coil to produce the required MMF. A potential operational constraint on the maximum operational speed of the device does arise, however, as a result of the resistance of the wire. This limitation arises because of the presence of inductance in the coil circuit. The large number of turns in the coils produces a significant inductance (L), and a large resistance (R) together with a large inductance affects the time constant (L/R) of the coil. The time constant is the inductance of the coil divided by the resistance of the coil. The time constant determines the maximum rate at which the coil can deplete the magnetic energy that it is storing. In the coil configuration described, the coil has to dump its magnetic energy two times per revolution, and this can never occur faster than allowed by the time constant.

The coil time constant is an inherent characteristic of the coil, but it is counteracted to a sufficient degree in the present invention by connecting a bank of gas-discharge (flourescent) light bulbs 19 in series with the resistance, and dumping the magnetic energy into this non-linear, capacitive, and voltage-limiting load. By inducing a resonating voltage-limiting load, the time constant (L/R) also goes down, enabling the coil to be dumped more quickly. Theoretically, if the capacitive reactance equals the inductive reactance, then the effect of the inductance is driven to zero, and the coil can be dumped instantly.

Winding the Coils

As noted above, the wire utilized in the coils is extremely thin, and thus extremely fragile. Therefore, great care must be taken when winding each coil to avoid breaking the wire. In particular, care must be taken to avoid any slack in the wire which will cause the wire to snap if the slack is suddenly taken up. A drag mechanism is utilized to apply constant drag to the wire's supply spool regardless of the diameter of wire remaining on the spool as the wire is pulled off the spool and wound onto the coil.

When winding each coil, the wire is essentially wrapped around the perimeter of a properly sized rectangle following the path A-B-C-D-A as illustrated in FIG. 2. The rectangular shape of the coil requires that additional steps be taken to avoid breaking the wire. A rectangular jig is configured and mounted in a centered position on a coil winding machine. Since the jig is rectangular, the radial distance from the central axis of the coil winding machine to the perimeter of the jig varies significantly as the jig rotates. It is preferable that the wire be pulled off the supply spool at an exit angle of 90° relative to the spool axis rather than at varying angles, in order to avoid putting extra stress on the wire. Therefore, the wire must either be run through a pulley system which accounts for the changing position of the perimeter of the jig, or the spool must be mounted a sufficient distance from the jig so that the change in the exit angle of the wire is minimized. If the spool is mounted a long distance from the jig, intermediate supports must be provided to prevent any significant droop (slack) from forming in the wire.

The coil winding machine should also be equipped with a variable speed control in order to slow down the rotation of the jig as the diameter of the wire on the supply spool is reduced and the coil diameter increases. Otherwise, the RPMs of the spool increase, making it difficult to maintain constant tension on the wire. Care should also be taken to avoid exceeding the snap slack strength of the wire when each corner of the rectangular jig is passed, the wire is laid along the following side of the rectangle, and the next corner is rotated into contact with the wire. The coil winding RPM must be kept slow enough to avoid snapping the wire.

Figure 3:
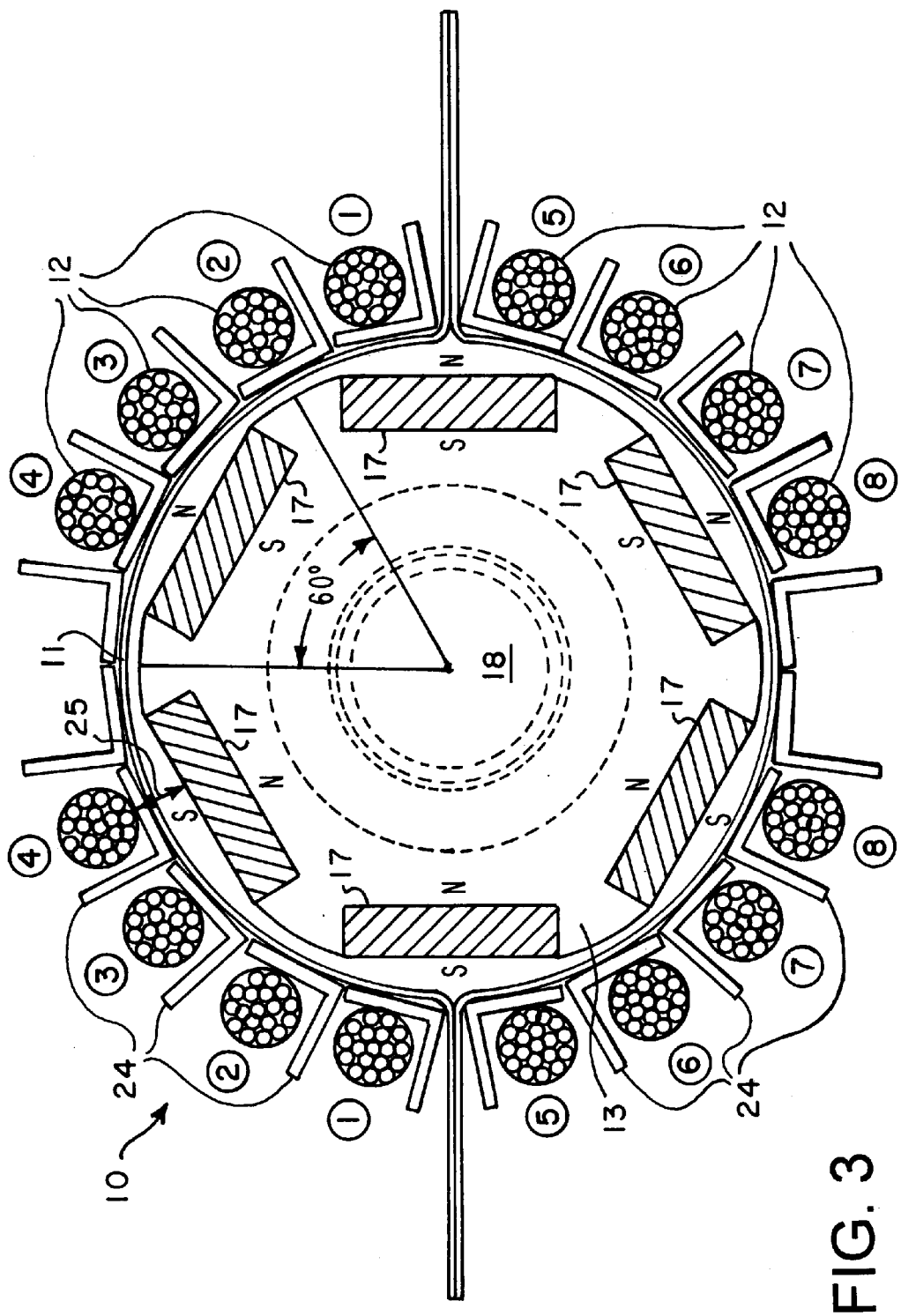
FIG. 3 is a cross-sectional view of the EMEC device taken along ling 3—3 of FIG. 2.

FIG. 3 is a cross-sectional view of the EMEC device 10 taken along ling 3—3 of FIG. 2. The positioning of the eight coils (coils 14 on top of the stator casing and coils 5–8 on the bottom) is illustrated in FIG. 3. A plurality of non-magnetic, L-shaped brackets 24 are mounted longitudinally on the stator casing 11. The brackets are spaced around the circumference of the stator casing to provide proper spacing of the coils. The stator casing is constructed of a non-magnetic material such as 6061 aluminum which enables the magnetic flux density to pass freely into and out of the device. The magnetic field produced by the externally mounted coils provides intense magnetic flux density in the interior of the stator casing. In the preferred embodiment, the stator casing has an inside diameter of approximately 6.25 inches, and is approximately 37.5 inches long. In an alternative embodiment, the stator casing and rotor are sized so that the coils may be mounted on the inner surface of the non-magnetic stator casing 11. In either embodiment, the maximum gap 25 between the outer surface of any one of the permanent magnets and a coil directly overlying the magnet is approximately 0.4 inches.

The Rotor

The rotor shaft 18 is longitudinally mounted in the center of the stator casing 11. The widest diameter of the rotor is 5.85 inches, leaving just 0.2 inches clearance between the outer surface of the rotor (and the permanent magnets 17) and the inside surface of the stator casing. The permanent magnets are mounted in six slots around the circumference of the rotor so that the top surface of each magnet is flush with the widest outside diameter of the rotor. In the preferred embodiment, there are 54 grade 35 neodymium iron-boron magnets, each of which is 2 inches long, 2 inches wide, and 0.5 inch high. Set screws are utilized to adjacently mount the magnets in the slots to form six rectangular bars comprising 9 magnets each. Thus, bars are formed which are approximately 18 inches long, 2 inches wide, and 0.5 inch high.

The magnets are mounted in two groups of three bars, with the magnets in each group being mounted on opposite sides of the rotor and in opposite polarity. For example, three contiguous bars are mounted with their north poles facing radially outward from the center of the shaft, and the other three contiguous magnets are mounted with their south poles facing radially outward from the center of the shaft. This configuration provides one large pole-pair of magnets on the rotor. Each group of three magnets produces a resultant magnetic vector which essentially places the magnetic pole for the magnet grouping over the center magnet in the group.

Grade 35 neodymium iron-boron magnets are utilized in the preferred embodiment because they have extremely high magnetic strength, with superior flux density and high magnetic field intensity for their size and mass. Additionally, neodymium iron-boron magnets are manufactured items, providing flexibility in their specified size, shape, and magnetic field strength. Their availability is also more assured than naturally occurring magnets which have to be discovered and mined. Magnets suitable for use in the EMEC device may be ordered as part number 35NE2812832 (grade 35 neodymium iron-boron magnets) from Magnet Sales and Manufacturing Company, 11248 Playa Court, Culver City, Calif. 90203. These magnets have a closed circuit magnetic flux density of 12,300 gauss, and an intrinsic magnetic field intensity of 11,300 oersteds.

Since neodymium iron-boron magnets may be manufactured in different sizes and shapes, different permanent magnet configurations may be implemented while still achieving the benefits of the present invention. For example, instead of configuring the magnets into three bar magnets in each group, magnets with their north pole facing outward may be mounted to completely cover almost one-half of the rotor surface. In effect, this creates a curved magnet on one side of the rotor with the magnet's north pole as its outer convex surface. Magnets with their south pole facing outward may be mounted to cover most of the other half of the rotor surface. In effect, this creates a curved magnet on the other side of the rotor with the magnet's south pole as its outer convex surface. The configuration of the preferred embodiment was selected as optimum based on the cost of the neodymium iron-boron magnets and the magnetic flux density produced.

Extremely strong neodymium iron-boron magnets also provide flexibility in the overall design of the EMEC device. What is desired in the overall design is to achieve a specified level of interaction between the magnetic field of the permanent magnets and the magnetic field generated by the coils. The specified level of interaction is the level at which the motor produces useful mechanical energy while the time rate of change of flux linkages develops sufficient counter-electrical voltage to charge the external battery power source. The magnetic field intensity of the neodymium iron-boron magnets provides some degree of flexibility in the design of the coils as well as the voltage applied to the coils because their strength offers a wider range of interaction. The coil magnetic intensity can be significantly lower than the intensity of the permanent magnets, equal to, or significantly greater than the intensity of the permanent magnets. The intensity of the coil magnetic field can be controlled to fall anywhere in this range in order to control the output of the ENEC device. Magnets of lesser strength can therefore be utilized, but the range of control will be proportionally less. The range of control provided by the intense magnetic strength of the neodymium iron-boron magnets additionally allows the coils to be connected in parallel rather than in series to selectively control the coil magnetic field intensity.

Figure 4:
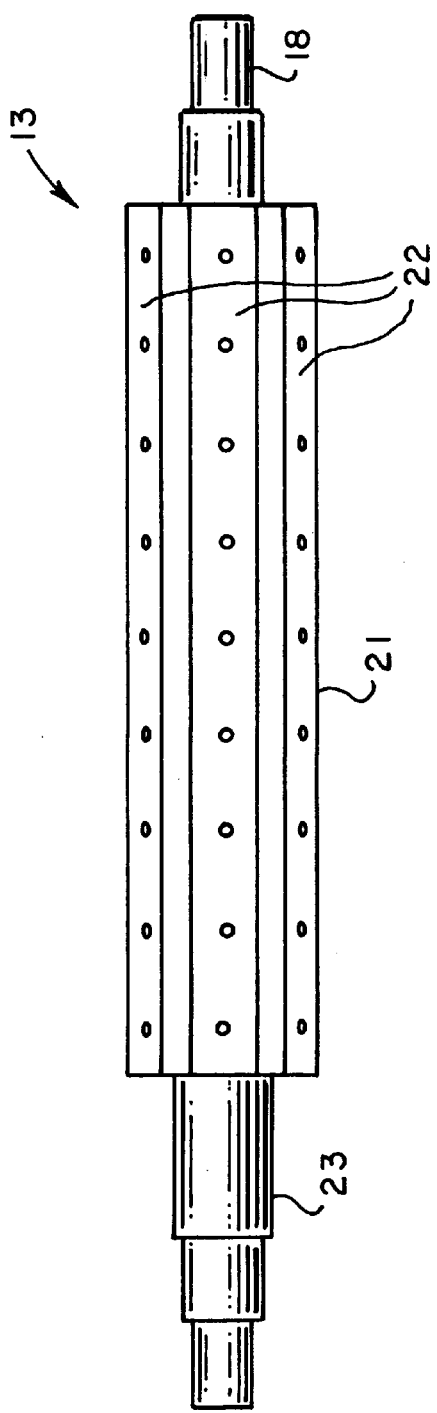
FIG. 4 is a side elevational view of the rotor.

Referring to FIG. 4, a side elevational view of the rotor 13 is shown. Like the stator casing, the rotor is also constructed of a non-magnetic material which is preferably aluminum. The permanent magnets 17 are mounted in section 21 of the rotor having the widest diameter. Six slots 22 are provided for mounting the permanent magnets. Section 23 of the rotor shaft is utilized to mount the commutator 14 which is discussed further in connection with FIGS. 6 and 7 below.

Figure 5A:
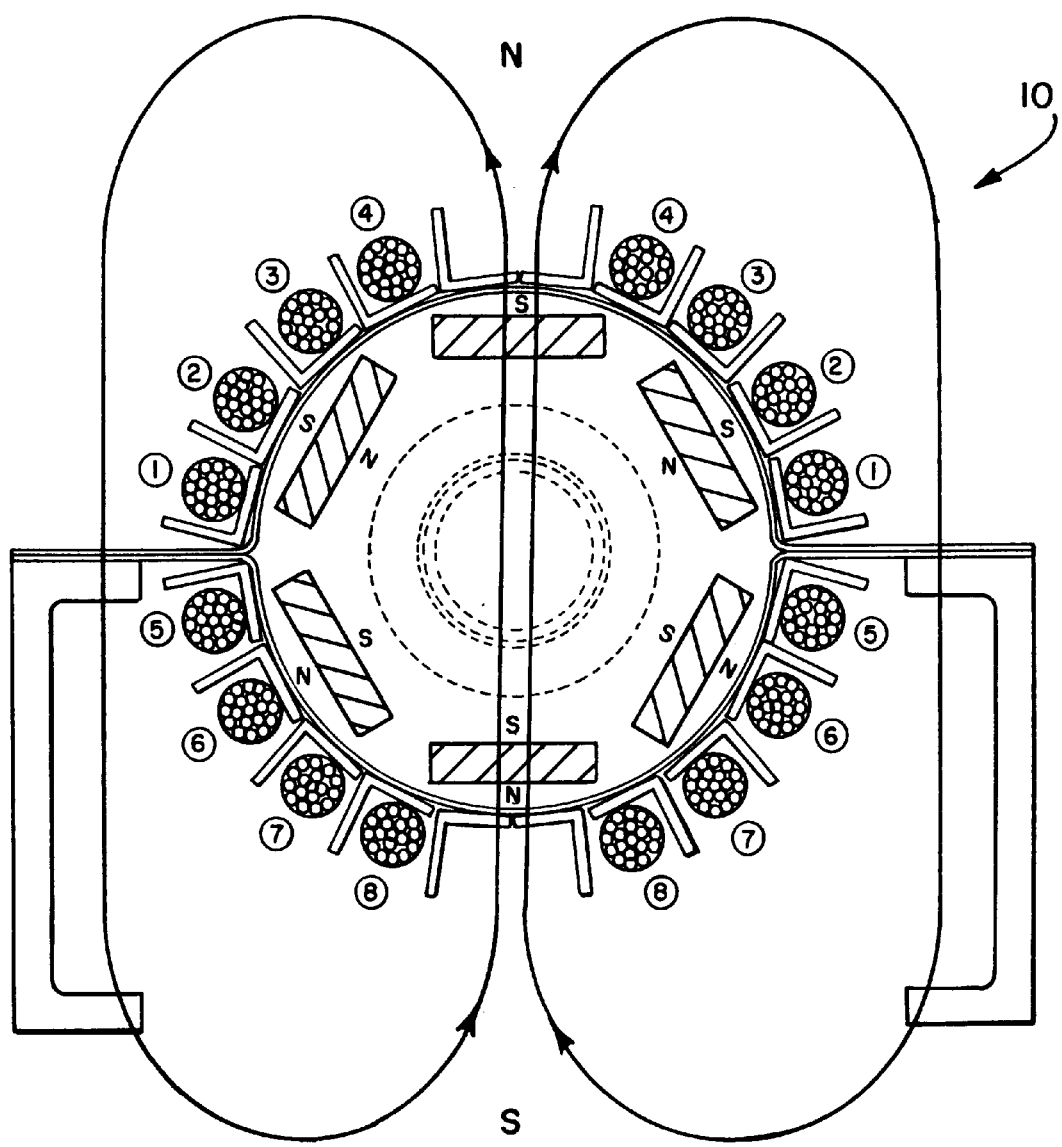
FIGS. 5A and 5B are illustrative drawings of opposite polarities of the magnetic field produced by the stator coils, with the rotor at the commutation point for each polarity.
Figure 5B:
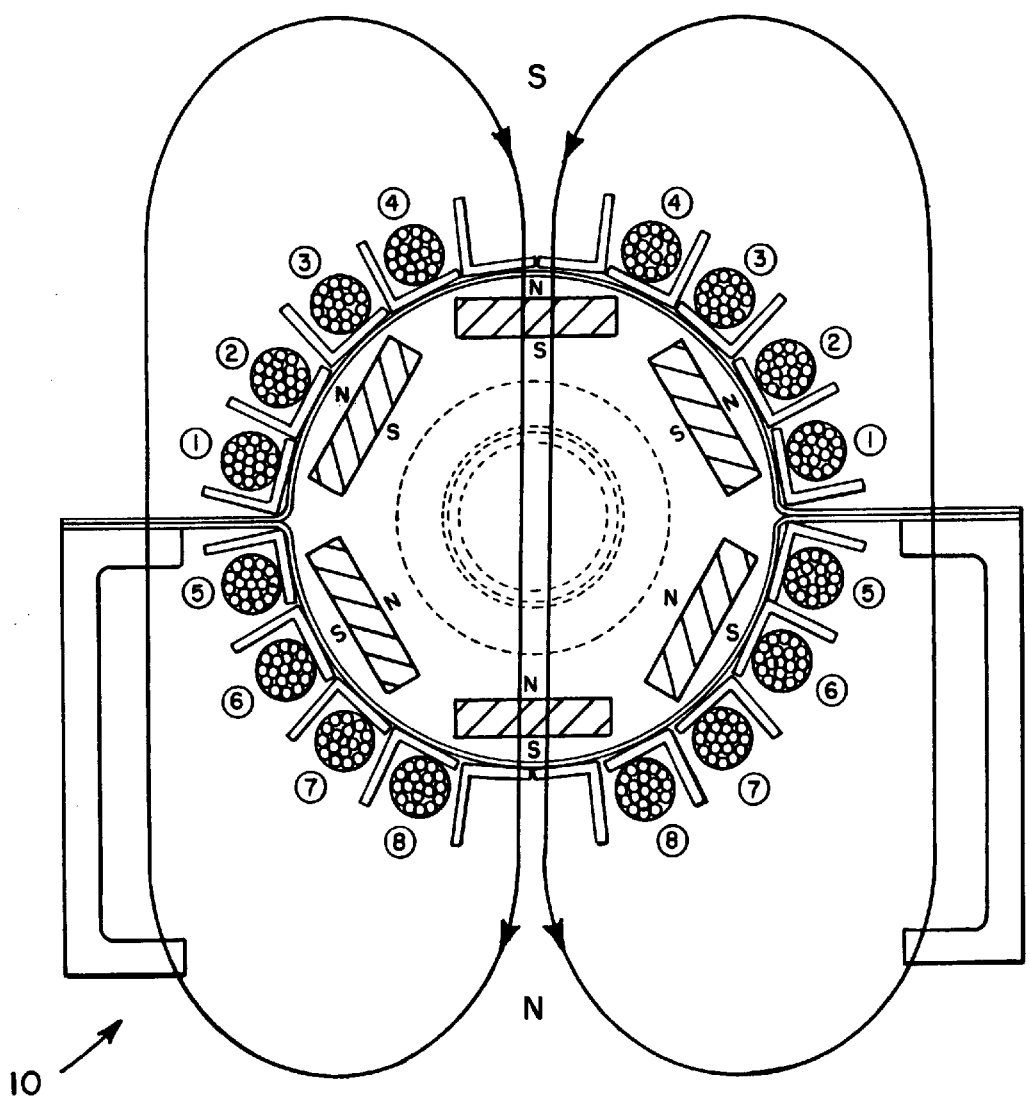

FIGS. 5A and 5B are illustrative drawings of opposite polarities of the magnetic field produced by the stator coils 12, with the rotor 13 being at the commutation point for each polarity. As in any electric motor, when a current is started in the coils, a magnetic polarity is established. For example, by applying a current in one direction in coils 14, and in the same direction in coils 5–8, a magnetic field may be established within the stator casing in which the north pole is up, and the south pole is down. This polarity is illustrated in FIG. 5A. The opposite polarity (south pole up and north pole down) is illustrated in FIG. 5B. If the magnetic polarity is aligned with the magnetic polarity of the permanent magnets on the rotor, the rotor tries to line up. In other words, if the three permanent magnets with their north magnetic poles facing outward are near the top of the rotor shaft, and the three permanent magnets with their south poles facing outward are near the bottom of the shaft, the permanent magnets will be repelled by the like magnetic poles of the magnetic field from the coils. This causes the shaft to rotate. As the shaft passes the 90° point, there is maximum torque on the shaft as the permanent magnets with their north poles facing outward are repelled by the north pole of the coil magnetic field while they are attracted by the south pole of the coil magnetic field. Likewise, the permanent magnets with their south poles facing outward are repelled by the south pole of the coil magnetic field while they are attracted by the north pole of the coil magnetic field. If nothing else is done, the rotation of the rotor shaft will stop when the resultant magnetic vector of the permanent magnets achieves alignment with the magnetic poles of the magnetic field from the coils (i.e., when the center magnet of opposite polarity reaches the coil magnetic pole). This is the point of commutation.

The Commutator

For motor action, the rotation must continue past the point of commutation. Therefore, just before the resultant magnetic vector of the permanent magnets achieves alignment with the magnetic poles of the magnetic field from the coils, the polarity of the magnetic field from the coils is reversed (commutated). The momentum of the rotating shaft carries the permanent magnets past the commutation point during the time period that the commutation is taking place. The commutation is a three-step process. First, the electrical energy being supplied to the coils is disconnected. Second, most of the energy in the coils (at least 95%) is discharged so that the magnetic field rapidly collapses. The energy may be discharged into a capacitive and voltage-limiting load such as a bank of flourescent lamps 19. Finally, the energy is reapplied to the coils with the opposite polarity. At this point, the permanent magnets are again out of alignment with the magnetic field of the coils by approximately 180°, and once again, the realignment process is started by rotating the rotor shaft.

Figure 6:
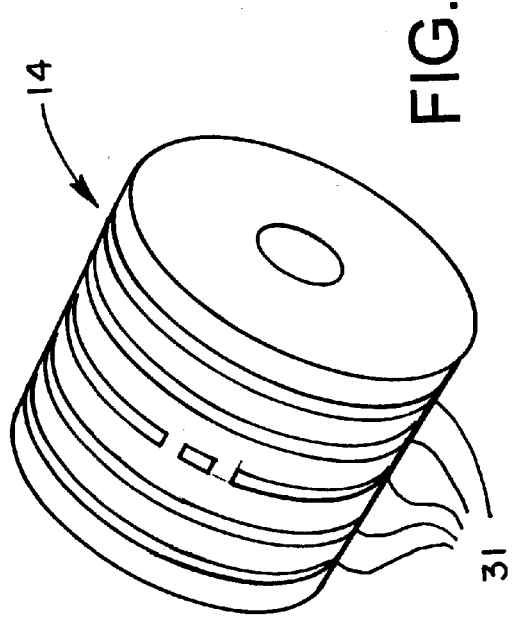
FIG. 6 is a perspective view of the commutator.

FIG. 6 is a perspective view of the commutator 14. The timing and control of the polarity shift is very critical, and this is the purpose of the commutator. The commutator is a cylindrically-shaped disk which is mounted on section 23 of the rotor shaft 18 (FIG. 4). The disk is constructed of a non-conductive insulating material such as epoxy. Contact strips 31 are mounted around the circumference of the commutator. As the commutator rotates on the rotor shaft, the contact strips are contacted by stationary contactors 20 (FIG. 1) in order to apply power to the coils, discharge the coils, and control the timing of the commutation.

Figure 7:
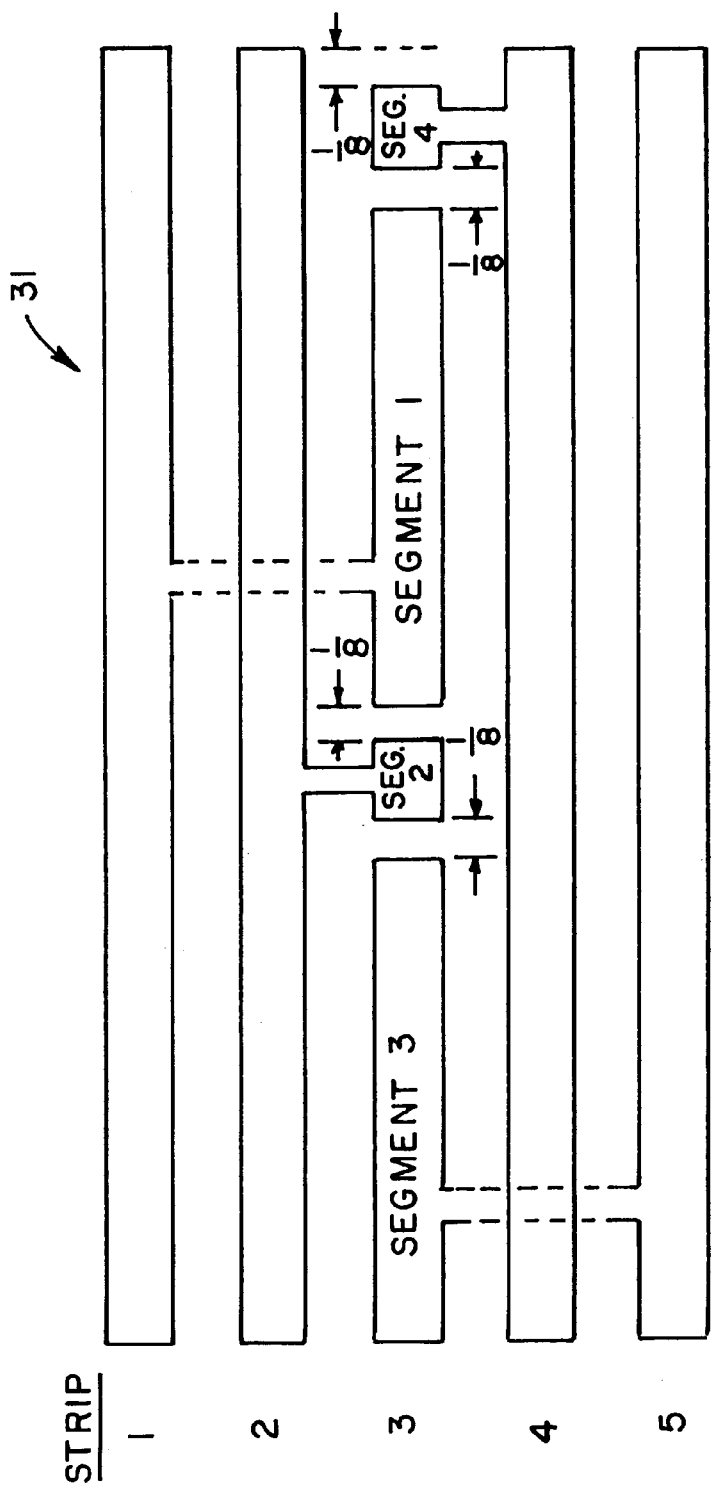
FIG. 7 is a linear layout of the commutator contact strips illustrating the relationships and connections between the various strips.

FIG. 7 is a linear layout of the commutator contact strips 31 which illustrates the relationships and connections between the various strips. As shown in FIG. 6, the strips are, of course, continuous strips around the circumference of the commutator 14. As the commutator rotates on the rotor shaft 18, the contactors 20 move from right to left along the contact strips, as the strips are illustrated in FIG. 7.

As noted above, commutation is a three-step process: (1) disconnect the power source, (2) discharge the coils, and (3) reapply the power source with the opposite polarity. Strips 1 and 5 are positive and negative power strips, respectively, which are utilized to apply power of a given polarity to the coils. These strips are continuous strips with no breaks around the circumference of the commutator. Strips 2 and 4 are positive and negative discharge strips which are utilized to discharge the energy from the coils 12 during commutation, and send the energy to a capacitive and voltage-limiting load such as flourescent lamps 19. These strips are continuous strips with no breaks around the circumference of the commutator. Since strips 1, 2, 4, and 5 are continuous strips with no breaks around the circumference of the commutator, the contactors which contact these strips can be placed at any location around the circumference.

Strip 3 is the timing and control strip, and comprises four segments. A break of approximately ⅛th inch is placed between each segment to prevent high voltage arching between the segments. Segments 1 and 3 are located 180° from each other around the circumference of the commutator, as are segments 2 and 4. While the contactor for strip 3 is in contact with segment 1, positive power is applied to the coils through strip 1 in order to produce a magnetic field of a first polarity. Segment 1 of strip 3 is connected to the positive power strip 1 by tunneling under strip 2 through the epoxy body of the commutator. Following a ⅛th-inch break, the contactor contacts segment 2 which is connected to discharge strip 2 which controls the discharge of the positive coil energy into the bank of flourescent lamps 19. Following another ⅛th-inch break, the contactor contacts segment 3 which is connected to negative power strip 5 by tunneling under strip 4 through the epoxy body of the commutator. Segment 3 controls the application of negative power to the coils in order to produce a magnetic field of a second and opposite polarity of that produced by segment 1. Following another ⅛th-inch break, the contactor contacts segment 4 which is connected to discharge strip 4 and controls the discharge of the negative coil energy into the flourescent lamps. Following a final ⅛th-inch break, the contactor returns to segment 1, and the cycle is repeated.

For proper timing and adequate separation of segments to prevent high voltage arching, the commutator 14 has a diameter of nine (9) inches. Table 1 below illustrates the resulting lengths (in inches) of each of the segments of strip 3, the timing and control strip.

TABLE 1

| Diameter | Circumference | Segment 1 | Segment 2 | Segment 3 | Segment 4 |
|---|---|---|---|---|---|
| 9 | 28.2743 | 13.2224 | 0.6646 | 13.2224 | 0.6646 |

With the coil configuration described, commutation is performed every 180° of shaft rotation, thereby producing a pulsating torque. This pulsation can be reduced by configuring additional sets of coils around the circumference of the stator casing. For example, with two pairs of coils mounted orthogonally, commutation is performed every 90° of shaft rotation. Likewise, with three pairs of coils mounted equidistant around the circumference, commutation is performed every 60° of shaft rotation.

The Power Source

As stated above, in the present invention, the magnitude of the current is kept extremely small, and the number of coil turns is maximized in order to produce the same MMF as conventional electric motors utilizing high current inputs. The present invention has been shown to operate satisfactorily with electrical inputs of approximately 450 volts and milliamperes; 900 volts and 30 milliamperes; and 1,350 volts and 30 milliamperes. In general, voltages greater than 450 volts and currents in the range of 3040 milliamperes should produce satisfactory performance with the configuration described.

Figure 8:
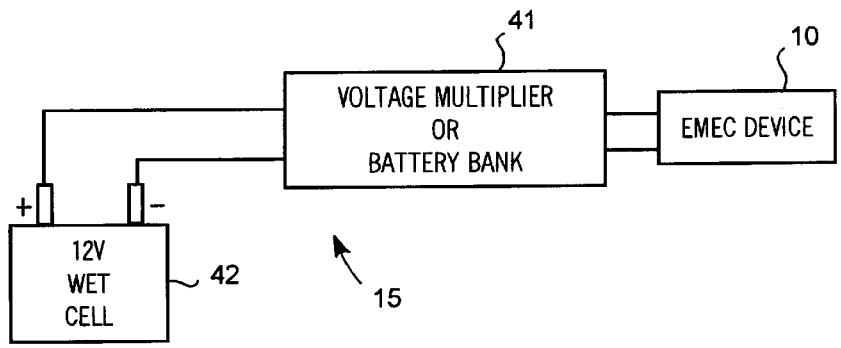
FIG. 8 is a simplified block diagram of the external power source.

FIG. 8 is a simplified block diagram of the external power source 15. In the preferred embodiment, the power source includes a voltage multiplier 41 and a wet cell 42. The voltage multiplier is a regulated, voltage-controlled, voltage multiplier that produces an output voltage which is variable from 0 to 5,000 volts at 30 to 40 milliamps (maximum). The wet cell, such as a 12-volt automobile battery, is connected to the voltage multiplier to absorb the unsafe portion of the negative back-spike which is produced at the point of commutation.

Alternatively, the voltage multiplier can be replaced by a bank of 9-volt batteries connected in series to produce the input voltage and current. For example, fifty (50) 9-volt batteries connected in series produce an input of 450 volts and 30 milliamps; one hundred (100) 9-volt batteries connected in series produce an input of 900 volts and 30 milliamps; and one hundred and fifty (150) 9-volt batteries connected in series produce an input of 1,350 volts and 30 milliamps.

The Control Unit

Figure 9:
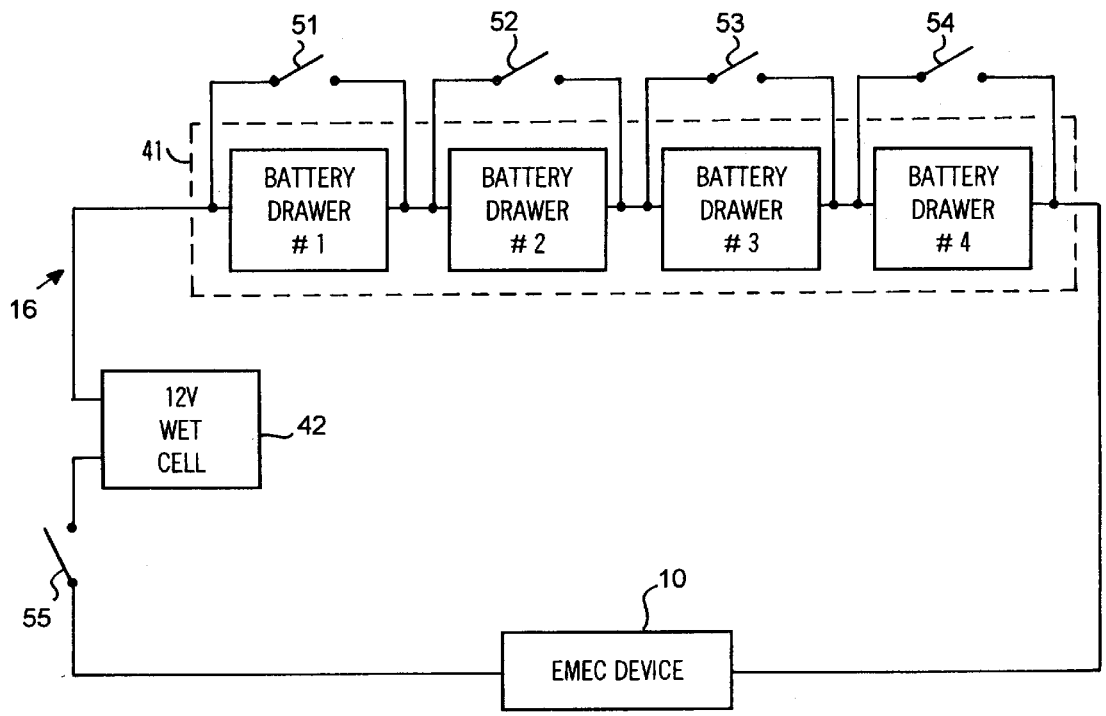
FIG. 9 is a simplified block diagram of a control unit suitable for use with the EMEC device of the present invention.

FIG. 9 is a simplified block diagram of a control unit 16 suitable for use with the EMEC device of the present invention. In FIG. 9, the control unit 16 is integrated with the power source 15. The embodiment utilizing a bank of 9-volt batteries is illustrated. The batteries may be loaded in battery drawers 14, each drawer containing, for example, fifty (50) 9-volt batteries connected in series. The resulting output of each drawer is approximately 450 volts at 30–40 milliamperes. A series of switches 51–54 are utilized to selectively connect battery drawers into the circuit. A main switch 55 opens and closes the main circuit. The wet cell 42 is connected in series with the battery bank 41 to absorb the negative back-spike produced at the point of commutation.

There are many variables in the design of the EMEC device of the present invention, and each variable may fall within an acceptable range of values which depends on the other variables in the design. For example, the input voltage to the coils can change, depending on the configuration of the coils and the strength of the permanent magnets on the rotor. Any combination, however, should result in a device which produces a net positive generated voltage (and current to a resistive load) while the device is operating as a motor (i.e., producing a net positive output torque).

It is thus believed that the operation and construction of the present invention will be apparent from the foregoing description. The apparatus and method described herein as being preferred illustrates a d.c. device in which the permanent magnets are mounted on the rotor, and two sets of coils are mounted on the stator. It will be readily apparent to those skilled in the art, however, that various changes and modifications could be made therein to construct an a.c. device, a device with additional sets of coils, or a device with coils mounted on the rotor and permanent magnets mounted on the stator without departing from the scope of the invention as defined in the following claims.

What is claimed is:

1. An electro-mechanical energy conversion device comprising:
   a stator comprising a first coil of a first magnetic polarity mounted on a first side of the stator and a second coil of an opposite polarity mounted on an opposite side of the stator;
   a rotor rotationally mounted in the stator, the rotor including at least two permanent magnets mounted circumferentially thereon, a first magnet on a first side of the rotor having a first outward polarity and a second magnet on an opposite side of the rotor having an outward polarity opposite the first polarity;
   a direct current power source connected to the coils, the output of the power source being at least 450 volts in a range of 30 to 40 milliamperes;
   a switching device that reverses the polarity of the first and second coils every 180° of rotor rotation; and
   a non-linear, capacitive, voltage-limiting load connected to the coils for rapidly dumping magnetic energy from the coils when the switching device reverses the polarity of the first and second coils.

2. The electromechanical energy conversion device of claim 1 wherein the switching device is a commutator that includes means for guiding the magnetic energy from the coils to the non-linear, capacitive, voltage-limiting load.

3. The electromechanical energy conversion device of claim 1 wherein the first coil comprises four individual coils of the first polarity, and the second coil comprises four individual coils of the opposite polarity.

4. The electromechanical energy conversion device of claim 3 wherein each individual coil comprises at least 6,000 turns of approximately 34 AWG gauge teflon-coated wire.

5. The electro-mechanical energy conversion device of claim 1 wherein the stator includes a cylindrical stator casing constructed entirely of non-magnetic material, the stator casing having an inner surface and an outer surface, and the first and second coils being mounted on the outer surface of the stator casing.

6. The electro-mechanical energy conversion device of claim 5 wherein the four individual coils of the first polarity are similar rectangular coils concentrically mounted on the first side of the stator casing, and the four individual coils of the opposite polarity are similar rectangular coils concentrically mounted on the opposite side of the stator casing.

7. The electro-mechanical energy conversion device of claim 1 wherein the rotor is constructed of a non-magnetic material.

8. The electro-mechanical energy conversion device of claim 7 wherein the at least two permanent magnets comprise two groups of magnets, a first group on a first side of the rotor in which each magnet has a first outward polarity, and a second group on an opposite side of the rotor in which each magnet has an outward polarity opposite the first polarity.

9. The electro-mechanical energy conversion device of claim 8 wherein each of the plurality of permanent magnets has an outer surface, and the rotor has a diameter such that a total distance measured between the outer surface of any one of the permanent magnets and a coil directly overlying the magnet is approximately 0.4 inches.

10. The electromechanical energy conversion device of claim 9 wherein the permanent magnets are grade 35 neodymium iron-boron magnets.

11. An electro-mechanical energy conversion device comprising:
   a stator comprising a first coil of a first magnetic polarity mounted on a first side of the stator and a second coil of an opposite polarity mounted on an opposite side of the stator;
   a rotor rotationally mounted in the stator, the rotor including at least two permanent magnets mounted circumferentially thereon, a first magnet on a first side of the rotor having a first outward polarity, and a second magnet on an opposite side of the rotor having an outward polarity opposite the first polarity;
   a direct current power source connected to the coils, the output of the power source being at least 450 volts in a range of 30 to 40 milliamperes, the power source comprising:
      a regulated, voltage-controlled voltage multiplier; and
      a wet cell connected in series with the voltage multiplier; and
   a switching device that reverses the polarity of the first and second coils every 180° of rotor rotation.

12. An electro-mechanical energy conversion device comprising:
   a stator comprising a first coil of a first magnetic polarity mounted on a first side of the stator and a second coil of an opposite polarity mounted on an opposite side of the stator;
   a rotor rotationally mounted in the stator, the rotor including at least two permanent magnets mounted circumferentially thereon a first magnet on a first side of the rotor having a first outward polarity, and a second magnet on an opposite side of the rotor having an outward polarity opposite the first polarity;
   a direct current power source connected to the coils, the output of the power source being at least 450 volts in a range of 30 to 40 milliamperes, the power source comprising:
      a bank of batteries connected in series to produce at least 450 volts at 30 to 40 milliamperes; and
      a wet cell connected in series with the bank of batteries; and
   a switching device that reverses the polarity of the first and second coils every 180° of rotor rotation.

13. An electro-mechanical energy conversion device comprising:
   a stator comprising:
      a cylindrical stator casing constructed of non-magnetic material, the stator casing having an inner surface and an outer surface;
      a first armature coil of a first magnetic polarity comprising four similar rectangular coils concentrically mounted on a first side of the outer surface of the stator casing, each rectangular coil comprising at least 6,000 turns of approximately 34 AWG gauge teflon-coated wire; and
      a second armature coil of a polarity opposite the first polarity comprising four similar rectangular coils concentrically mounted on a side of the outer surface of the stator casing opposite the first side, each rectangular coil comprising at least 6,000 turns of approximately 34 AWG gauge teflon-coated wire;
   a rotor constructed of non-magnetic material rotationally mounted in the stator casing, the rotor including a plurality of permanent magnets mounted circumferentially thereon, the magnets on a first side of the rotor having a first outward polarity, and the magnets on an opposite side of the rotor having an opposite outward polarity, each of the plurality of permanent magnets having an outer surface, and the rotor having a diameter such that a total distance measured between the outer surface of any one of the permanent magnets and a coil directly overlying the magnet is approximately 0.4 inches;
   a direct current power source connected to the coils, the power source comprising:
      a regulated, voltage-controlled voltage multiplier with an output of 0–5,000 volts at to 40 milliamperes maximum; and
      a wet cell connected in series with the voltage multiplier;
   a non-linear, capacitive, voltage-limiting load connected to the coils for rapidly dumping magnetic energy from the coils; and
   a commutator comprising:
      means for reversing the polarity of the first and second coils every 180° of rotor rotation; and
      means for guiding the magnetic energy from the coils to the non-linear, capacitive, voltage-limiting load prior to reversal of the polarity.

14. An electromechanical energy conversion device comprising:
   a non-magnetic cylindrical stator casing having an outer surface and an inner surface;
   a plurality of armature coils mounted on the outer surface of the stator casing, said armature coils comprising at least one coil of a first magnetic polarity on a first side of the stator casing and at least one coil of an opposite polarity on an opposite side of the stator casing, said armature coils producing a magnetic field which is not shielded by the stator casing;
   a rotor rotationally mounted along the longitudinal axis of the cylindrical stator casing, the rotor having a plurality of permanent magnets mounted circumferentially thereon, the magnets on a first side of the rotor having a first outward polarity, and the magnets on an opposite side of the rotor having an outward polarity opposite the first outward polarity;

a direct current power source connected to the coils, the output of the power source being variable from 0 to 5,000 volts at a maximum current of approximately 40 milliamperes;

a non-linear, capacitive, voltage-limiting load connected to the coils for rapidly dumping magnetic energy from the coils; and a commutator that operates to reverse the polarities of the armature coils in a manner so as to rotate the rotor.

15. The electro-mechanical energy conversion device of claim 14 wherein each of the plurality of permanent magnets has an outer surface, and a total distance measured between the outer surface of any one of the permanent magnets and a coil directly overlying the magnet is approximately 0.4 inches.

16. The electro-mechanical energy conversion device of claim 15 wherein the armature coil comprises four coils of the first polarity and four coils of the second polarity.

17. The electro-mechanical energy conversion device of claim 16 wherein each coil of the first polarity and each coil of the second polarity is wound with at least 6,000 turns of wire which is approximately 34 AWG gauge.

18. The electro-mechanical energy conversion device of claim 17 wherein the plurality of permanent magnets are grade 35 neodymium iron-boron magnets.

19. The electro-mechanical energy conversion device of claim 18 wherein the direct current power source comprises:

a regulated, voltage-controlled voltage multiplier; and a wet cell connected in series with the voltage multiplier.

* * * * *